United States Patent [19]

Hilfiker

[11] 4,266,890
[45] May 12, 1981

[54] RETAINING WALL AND CONNECTOR THEREFOR

[75] Inventor: William K. Hilfiker, Eureka, Calif.

[73] Assignee: The Reinforced Earth Company, Washington, D.C.

[21] Appl. No.: 966,119

[22] Filed: Dec. 4, 1978

[51] Int. Cl.³ .............................................. E02D 17/00
[52] U.S. Cl. .................................. 405/286; 403/252; 403/254; 405/262
[58] Field of Search .............. 405/262, 272, 273, 284, 405/286; 14/26, 75; 403/252, 254; 52/166, 585

[56] References Cited

U.S. PATENT DOCUMENTS

| 554,680 | 2/1896 | Haentges | 405/273 |
|---|---|---|---|
| 1,089,842 | 3/1914 | Johnson | 52/166 |
| 3,686,873 | 8/1972 | Vidal | 405/262 |
| 3,888,055 | 6/1975 | Galco | 52/585 |
| 3,922,864 | 12/1975 | Hilfiker | 405/262 |
| 4,051,570 | 10/1977 | Hilfiker | 405/273 |
| 4,068,482 | 1/1978 | Hilfiker | 405/272 |

Primary Examiner—Roy D. Frazier
Assistant Examiner—Alexander Grosz
Attorney, Agent, or Firm—Naylor, Neal & Uilkema

[57] ABSTRACT

A retaining wall comprised of stacked precast stretchers having stacking pads with oppositely disposed slots formed therein for the receipt of connectors. The connectors comprise plates interposed between the pads and pins secured to the plates for engagement with the slots. Anchor rods are secured to the plates for attachment to embedded anchors.

3 Claims, 5 Drawing Figures

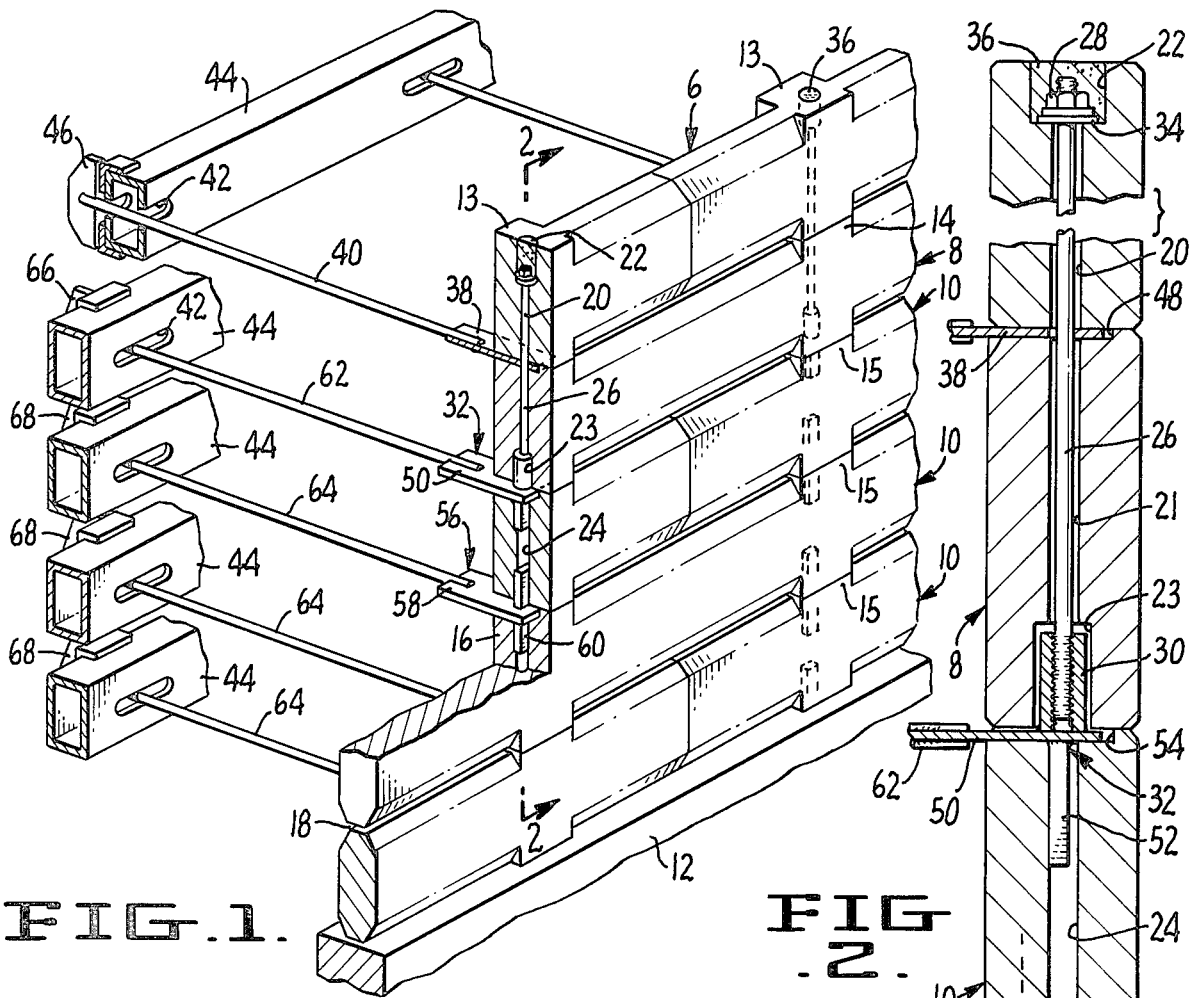
FIG.1.
FIG.2.
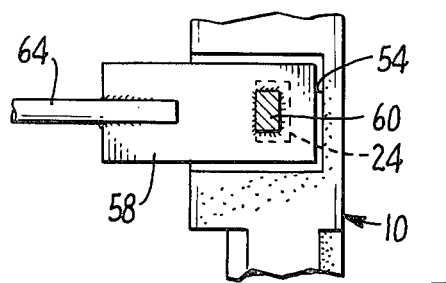
FIG.3.
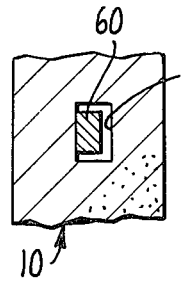
FIG.4.
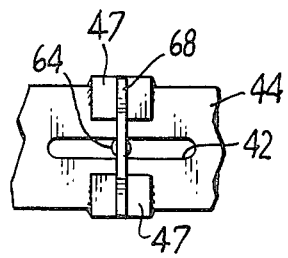
FIG.5.
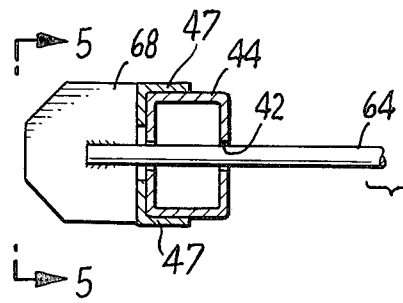
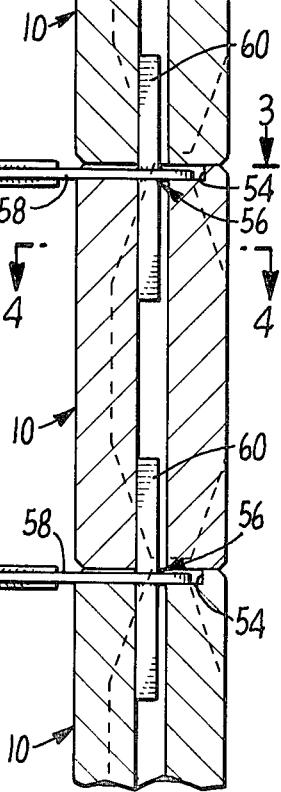

RETAINING WALL AND CONNECTOR THEREFOR

BACKGROUND OF THE INVENTION

The present invention relates to a retaining structure for earthen formations and, more particularly, is concerned with such a structure comprised of precast stretcher elements and an improved connector for securing such elements together and anchoring the composite structure in place.

The prior art relating to retaining walls of the type with which the present invention is concerned teaches securing precast stretchers together with tie rods and anchoring the stretchers with anchor rods secured to the tie rods. Such arrangements may be seen in my U.S. Pat. Nos. 4,051,570 and 4,068,482. The prior art also teaches the use of dowel-like elements to secure retaining wall stretchers in stacked relationship. Arrangements of the latter type may be seen in prior U.S. Pat. Nos. 1,174,819 and 1,819,026. In the latter patents, however, the dowel-like elements are not employed to establish connection to embedded anchors.

U.S. Pat. No. 3,686,873 is of interest in that it discloses a retaining wall made up of slabs which are held in stacked relationship by pin-like elements. In certain embodiments disclosed in this patent, the pin-like elements also serve as the connection points for anchoring straps. The pin-like elements of this patent are embedded slabs and rely upon this embedded condition for their support. They do not include plate members, such as those of the present invention, which serve to both support the connecting pins for the stretchers and act as the attaching means for anchors.

SUMMARY OF THE INVENTION

A principal object of the present invention is to provide an improved connector for securing the stretchers of a retaining wall in stacked relationship, without the necessity of employing tie rods which must be passed fully through the assembled stretchers.

Another object of the invention is to provide such a connector which may be assembled into place on a precast stretcher after the stretcher has been fully fabricated.

Another object of the invention is to provide such a connector which serves both to secure stacked stretchers in aligned relationship and to provide an attachment point for an embedded anchor.

Another object of the invention is to provide such a connector wherein the stresses imparted to the connector by the embedded anchor are transmitted to the stretchers through flat surface to surface contact.

A further object of the invention is to provide such a connector wherein some play between the connector and the stretcher is provided to facilitate ease of assembly.

Another object of the invention is to provide such a connector wherein a threaded connection is provided to enable a short length of tie rod to be connected thereto.

A further and more general object of the invention is to provide a retaining wall wherein simplified connectors and precast stretchers cooperate to facilitate ease of erection of the structure and provide for the effective and well-distributed imparting of anchoring forces to the wall.

Another general object of the invention is to provide an anchoring system for a retaining wall structure wherein the connectors which serve to secure precast stretchers in place also function to anchor the stretchers to embedded anchor elements and automatically provide for the secure connection of anchoring rods to the anchor elements.

The foregoing and other objects will become more apparent when viewed in light of the accompanying drawings and the following detailed description.

BRIEF DESCRIPTION OF THE DRAWINGS

FIG. 1 is a perspective view of a retaining wall, including the anchoring means therefor, constructed according to the present invention;

FIG. 2 is a cross-sectional elevational view taken on the plane designated by line 2—2 of FIG. 1;

FIGS. 3 and 4 are cross-sectional views taken on the planes designated by lines 3—3 and 4—4, respectively, of FIG. 2; and FIG. 5 is an elevational view taken on the plane designated by line 5—5 of FIG. 2.

DESCRIPTION OF THE PREFERRED EMBODIMENT

The precast stretchers of the wall shown in FIG. 1 are designated by the numerals 6, 8 and 10 and shown as being supported on a foundation 12. Each stretcher includes an elongated body of octagonal cross-section having spaced stacking pads integrally formed therewith. The stacking pads of the stretchers 6 and 8 are designated by the numerals 13 and 14, respectively, and the stacking pads of the stretchers 10 are designated by the numeral 15. Although not illustrated, it should be understood that the cementitious material (i.e., concrete) from which the stretchers are cast would typically be reinforced with internal steel reinforcement elements. The stacking pads have a depth greater than the depth of the elongate octagonal bodies in order to provide weep slots 18 between the stretchers. The weep slots 18 are provided by fabricating the stretchers so that the lower extremities of the stacking pads extend beneath the lower extremities of the elongate octagonal bodies.

The stretchers 6 and 8 have cylindrical tie rod passages 20 and 21, respectively, extending through the stacking pads thereof. Enlarged cylindrical recesses 22 are formed at the upper ends of the passages 20 and enlarged cylindrical recesses 23 are formed at the lower ends of the passages 21. The stretchers 10 have rectangular passages 24 extending vertically through the stacking pads thereof. The cross-sectional shape of the latter passages may be seen from FIG. 4.

Tie rods 26 extend through the passages 20 and 21. A nut 28 disposed in the recess 22 threadably engages the upper end of the rod 26 and an internally threaded pin 30 received in recess 22 threadably engages the lower end of the rod 26. The pin 30, as will become more apparent from the subsequent discussion, forms part of a connector 32. The nut 28 has washers 34 therebeneath and, as shown, is grouted over by cement 36.

Intermediate the stretchers 6 and 8, the tie rods 26 extend through apertured connecting plates 38. The plates 38 have anchor rods 40 secured thereto which extend through slots 42 in dead man anchors 44. The distal ends of the rods 40 carry plates 46 proportioned for slidable extension through the slots 42 and abutting engagement with reinforcing angles 47 integrally welded to and forming part of the rear sides of the dead man anchors 44. Such engagement may occur when the plates 46 are disposed at right angles relative to the slots. Plates 38 and 46 are fixed to the rods 40, as by welding, and disposed in planes oriented at right angles relative to one another. From FIG. 2 it will be seen that the upper sides of the stacking pads 14 are provided with grooves 48 for receipt of the plates 38 and that the outer ends of these grooves are closed so as to hide the plates 38 from exposure, as viewed from the outside of the retaining wall.

The connector 32 includes a connecting plate 50 having the pin 30 fixed thereto and extending upwardly therefrom and a rectangular pin 52 fixed thereto and extending downwardly therefrom. The upper ends of the stacking pads 15 are provided with grooves 54 for receipt of the plates 50. The grooves 54 are similar to the grooves 48 and formed with closed outer ends so as to shield the plates 50 from view from the exterior side of the retaining wall. In the assembled condition shown in FIG. 2, the rectangular pin 52 extends into the passage 24 of the stretcher beneath the connector 32. Thus, the connector 32 serves to hold the stretchers engaged thereby in stacked aligned relationship.

The connectors beneath the connector 32 are each designated in their entirety by the numeral 56. The latter connectors each comprise a plate 58 having a rectangular pin 60 fixedly secured thereto and extending into the passages 34 of the stretchers 10 to either side of the connector. The plates 58 are received in grooves 54 similar to the manner in which the plates 50 are received in the grooves 54. From FIG. 4, it will be appreciated that the pins 60 assume surface to surface contact with the passages 24. Although not illustrated in detail, it should be understood that the pin 52 also assumes such contact.

The connectors 32 and 56 have anchor rods 62 and 64, respectively, fixedly secured thereto. The latter anchor rods cooperate with dead man anchors 44 in a manner similar to that described with respect to aforementioned rod 40. Plates 66 and 68 are fixed, respectively, to the distal end of the rods 62 and 64 and cooperate with the dead man anchors 44 in a manner similar to that of the aforedescribed plate 46. In other words, the plates 66 and 68 are extensible to the slots 42 in the dead man anchors, and upon engagement of the connectors 32 and 56 to the retaining wall stretchers, the plates 66 and 68 assume a condition in abutting engagement with the rear sides of the dead man anchors. The latter relationship may be seen from FIG. 5.

In erecting the retaining structure of the present invention, the foundation 12 is first set and then each course of stretchers and associated anchors is successively set in place, starting with the lowermost course. In this process, the dead man anchors are first placed, then the anchor rods are extended therethrough and, finally, the anchor rods are connected to the stretchers. The latter connection functions, automatically, to assure that the plates on the distal ends of the anchor rods are engaged behind the dead man anchors. The lower courses of stretchers 10 are readily stacked with the connectors 56 interposed therebetween. The upper courses of stretchers 6 and 8 are stacked and secured together through means of the tie rods 26. The tie rods function to secure the uppermost course of stretchers 6 in cantilevered engagement with the course of stretchers 8 immediately therebelow. This relationship, together with the anchor provided by the anchor rods 40 and associated dead men anchors, functions to effectively secure the uppermost course of stretchers against displacement.

CONCLUSION

From the foregoing description, it is believed apparent that the present invention enables the attainment of the objects initially set forth. In particular, the invention provides a well anchored retaining wall structure comprised of precast stretchers which may be readily assembled in place without the necessity of threading long tie rods through the stretchers. It should be understood, however, that the invention is not intended to be limited to the specifics of the illustrated embodiment, but rather is defined by the accompanying claims.

What is claimed is:

1. A retaining structure comprising: elongate stacked preformed stretchers having stacking pads with opposed slots formed therein, said slots extending in a direction perpendicular to the elongate dimension of the stretchers; connector plates interposed between the stretchers in apposition to the stacking pads thereof, each said plate resting on and being supported by the stretcher therebelow and having fixedly secured thereto and extending thereabove and therebelow retaining pins engaged in the opposed slots of the stacking pads to maintain the stretchers in aligned stacked relationship; at least certain of said plates, having an anchor rod secured thereto and extending therefrom to an embedded anchor beam having a slot extending therethrough; and anchor plates secured to the distal ends of said rods in a disposition perpendicular to the connector plates secured thereto for extension through the slots when aligned therewith, and abutting engagement with the beams when turned to a position where the connector plates are interposed between apposed stacking pads.

2. A retaining structure according to claim 1, wherein at least certain of the slots and pins have complementally engagable flat surfaces extending in a direction parallel to the elongate dimension of the stretchers, said surfaces being disposed for engagement in response to the application of tension force to the anchor rods.

3. A retaining structure according to claim 1, wherein at least certain of the retaining pins are adapted to threadably receive a rod extending through an opening formed in a stretcher disposed in apposition to the connector plate secured to the pin.

* * * * *